United States Patent [19]

Choulat et al.

[11] 4,181,706
[45] Jan. 1, 1980

[54] METHOD AND APPARATUS FOR DECOMPOSING AMMONIA FUMES HAVING A HIGH HYDROGEN SULFIDE CONTENT

[75] Inventors: Gustav Choulat, Recklinghausen; Kurt Lorenz, Hattingen; Egon Petsch, Recklinghausen, all of Fed. Rep. of Germany

[73] Assignee: Firma Carl Still Recklinghausen, Fed. Rep. of Germany

[21] Appl. No.: 916,146

[22] Filed: Jun. 16, 1978

Related U.S. Application Data

[63] Continuation of Ser. No. 789,682, Apr. 4, 1977, abandoned.

[30] Foreign Application Priority Data

Apr. 24, 1976 [DE] Fed. Rep. of Germany ....... 2618027

[51] Int. Cl.² .......................................... B01D 53/34
[52] U.S. Cl. .................................. 423/237; 423/210; 423/224; 423/351
[58] Field of Search ................ 423/210, 224, 237, 351

[56] References Cited

U.S. PATENT DOCUMENTS

| | | | |
|---|---|---|---|
| 3,505,027 | 4/1970 | Breitbach et al. | 423/351 X |
| 3,540,189 | 11/1970 | Siewers et al. | 423/237 X |
| 3,661,507 | 5/1972 | Breitbach et al. | 423/237 X |
| 3,822,337 | 7/1974 | Wunderlich et al. | 423/237 X |
| 3,915,655 | 10/1975 | Grulich et al. | 423/237 X |
| 3,970,743 | 7/1976 | Beavon | 423/237 X |
| 3,987,154 | 10/1976 | Legas | 423/237 X |
| 4,050,990 | 9/1977 | Lorenz | 423/237 X |

Primary Examiner—Earl C. Thomas
Attorney, Agent, or Firm—McGlew and Tuttle

[57] ABSTRACT

A method of decomposing ammonia fumes which have a high hydrogen sulfide content, in particular, deacidizer fumes from an $NH_3$—$H_2S$ closed-circuit scrubber of coke oven gases, in which the washed-out $NH_2$ is enriched. The inventive method comprises burning a heating fuel with an amount of oxygen to generate combustion gases having a low oxygen content, heating the deacidizer fumes by direct contact with the combustion gases in order to form a hot mixture of the gases and deacidizer fumes and subsequently directing the hot mixture through a decomposition zone. In addition the ammonia fumes are directed in an annular jacket around the housing to an annular discharge at the periphery of the coke oven gas flame.

1 Claim, 4 Drawing Figures

U.S. Patent
Jan. 1, 1980
4,181,706
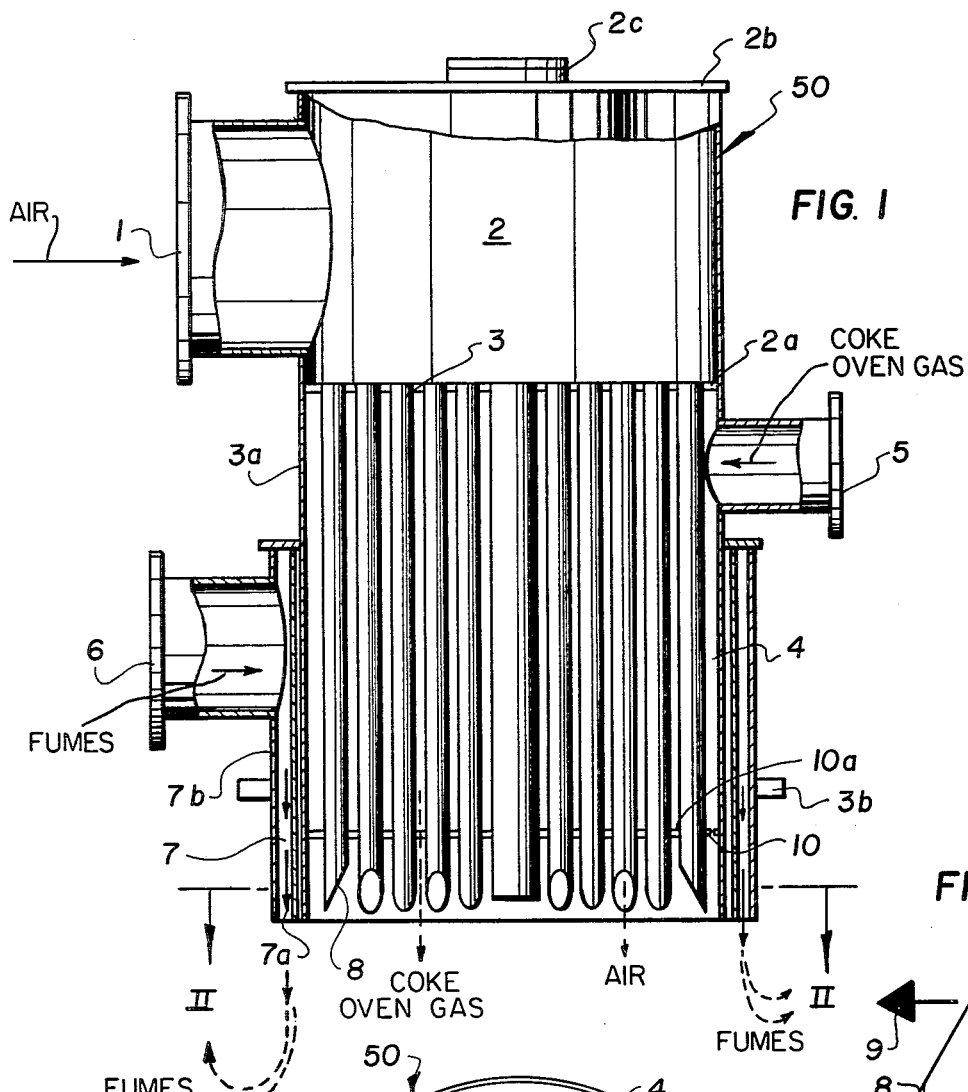
FIG. 1
FIG. 2
FIG. 3
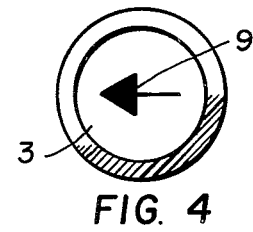
FIG. 4

METHOD AND APPARATUS FOR DECOMPOSING AMMONIA FUMES HAVING A HIGH HYDROGEN SULFIDE CONTENT

This is a continuation of application Ser. No. 789,682 filed Apr. 4, 1977, and now abandoned.

FIELD AND BACKGROUND OF THE INVENTION

This invention relates in general to the construction of coke oven furnaces and associated equipment and, in particular, to a new and useful method and apparatus for decomposing ammonia fumes which have a high hydrogen sulfide content.

DESCRIPTION OF THE PRIOR ART

The present invention relates to a method of decomposing ammonia fumes having a high hydrogen sulfide content, in particular, deacidizer fumes from an $NH_3$—$H_2S$ closed-circuit scrubber for crude coke oven gases, in which the washed-out $NH_3$ is enriched. The operational steps include heating the deacidizer fumes in direct contact with the gaseous products of combustion obtained by burning a heating fluid, particularly fuel gas, and directing the hot mixture through a decomposition zone which is either free or filled with a heat resisting filling material or with a catalyst of any shape.

A method of burning the ammonia contained in coke oven or gaswork gases is known from German Pat. No. 1,202,772, in which the ammonia is washed out with water; the substantially deacidized washings and condensates are separated, and the stripped ammonia fumes are heated, in a first stage, by burning a fuel. The hot mixture is directed through a decomposition zone which is free or filled with temperature-resisting filling bodies or a nickel catalyst of any shape, and the hot gases leaving the decomposition zone are burned down in a second stage, by a new addition of air.

It is further known from German Pat. No. 1,223,818 to feed fumes which are obtained without preliminary deacidification into the decomposition zone by stripping from the washings and condensates.

Also known is a complete removal of all the free ammonia contained in coke oven gases and washed out with water and enriched in the deacidizer fumes of the hydrogen sulfide scrubber, by burning the total volume of the deacidizer fumes and, thereby, decomposing the ammonia into nitrogen and water in a single stage in which process, the heat of combustion of the ammonia is recovered in the form of high-pressure steam, the condensate is separated, and the sulfur dioxide contained in the combustion gases is processed to sulfuric acid (German Pat. No. 1,163,786).

As shown in German Pat. No. 1,212,052, it is also possible to obtain sulfur instead of sulfuric acid with a suitably limited air supply.

The foregoing methods, with a two-stage combustion of ammonia, have the advantage that only a small amount of nitric oxides form during the $NH_3$ combustion. It has been found, however, that the two-stage methods, particularly if they are carried out, not only with thermal but also with catalytic reactions, lead to difficulties in cases where the ammonia fumes to be decomposed have a high content of hydrogen sulfide. That is, in such a process of decomposing $NH_3$ contained in deacidizer fumes of $NH_3$—$H_2S$ closed-circuit scrubbers, which comprise, aside from the entire $H_2S$, also the entire $NH_3$ as well as HCN of the crude coke oven gases, already in the first stage of combustion, i.e., the decomposition stage of $NH_3$ and HCN, the $H_2S$ reacts with the atmospheric oxygen under formation of elementary sulfur. This amorphous sulfur becomes deposited not only in the direct cooler which is provided after the waste heat boiler of the decomposition stage, but is entrained by the decomposition and cracked gases into the following gas conduits and apparatus also, where it deposits as a pulpy mass and causes clogging. A small amount of $H_2S$ is also further oxidized to $SO_2$ which becomes dissolved in the condensates and in the cooling water used in the circuit. The water becomes sour and causes corrosion in the apparatus.

SUMMARY OF THE INVENTION

The present invention is directed to a method of the kind mentioned above, in which the formation of elementary sulfur, as well as the partial further oxidation to $SO_2$ is avoided, so that clogging and corrosive action are prevented.

In accordance with the invention, a method is provided in which first the heating fluid is burned and then the combustion gases having a low oxygen content are mixed with the deacidizer fumes and directed into the decomposition zone. In this process, the gas mixtures have a temperature of 1000° to 1200° C. prior to entering the decomposition zone.

In a preferred variant of the method, the decomposition zone is filled with a catalyst, particularly, a nickel catalyst. Metallic nickel precipitated on carrier bodies, for example, rings or balls of magnesite or aluminum oxide, have proven to be particularly suitable as a catalyst.

If air is used for the combustion of the heating fluid, for example, a fuel gas, a high discharge velocity at the outlet of any burner has a favorable effect. In such a case, air flow velocities of 6 to 12 m per second, particularly, 8 m per second, are advantageous.

It has also been found advantageous to provide the burner for the heating fluid and feed the deacidizer fumes either at the top of the decomposition zone, or of a decomposition reactor in order to obtain a turbulent mixing of the combustion gases with the deacidizer fumes. The gas stream is then forced downwardly, in the opposite direction of its lift, and this results in a particularly intimate mixing.

While carrying out the inventive method, experience has shown that with the higher $H_2S$ content in the deacidizer fumes, as compared to stripped fumes, i.e., ammonia fumes, having a lower $H_2S$ content, there is an increased tendency to form organic sulfur compounds. As is well known, the $H_2S$ of the deacidizer fumes reacts with CO and $CO_2$ coming from the decomposition of the hydrogen cyanide contained in the deacidizer fumes and present in the combustion gases, whereby, COS and $CS_2$ are formed. Because of the shifted balance, water vapor in the reactive mixture acts to the effect of decomposing these substances. Although water vapor is always present in the deacidizer fumes, it has been found advantageous for the inventive method to introduce additional steam to the fuel gas employed as heating fluid, or to the combustion air, or to both. As is well known, COS and $CS_2$ can be separated from gases only by expensive methods. Moreover, the addition of steam reduces the tendency to soot formation.

A special burner arrangement has proved particularly suitable, which can be mounted on top of the NH₃ decomposition reactor for carrying out the method. This arrangement contributes quite considerably to the mixing of the fuel gas with the combustion air, which is followed by the admixture of the deacidizer fumes.

Accordingly, it is an object of the invention to provide an improved method of decomposing ammonia fumes which have a high hydrogen sulfide content and, in particular, for decomposing deacidizer fumes from an $NH_3$—$H_2S$ closed-circuit scrubber of crude coke oven gases, in which the washed-out $NH_3$ is enriched, comprising burning a heating fuel with an amount of oxygen to generate combustion gases having a low oxygen content, heating the deacidizer fumes by direct contact with the combustion gases to form a hot mixture of the gases and the deacidizer fumes, and directing the hot mixture through a decomposition zone.

A further object of the invention is to provide a burner for decomposing ammonia fumes which includes a cylinder having a plurality of tubes for the feeding of combustion air therethrough to discharge ends of the tubes which are located in discharge streams from a coke oven gas chamber defined around the tubes and which further includes means for directing the deacidizer fumes or ammonia fumes annularly into the path of the coke oven gases and combustion air in a flame generated by the burning of the coke oven gases with the combustion air.

A further object of the invention is to provide a burner for decomposing ammonia fumes having a high hydrogen sulfide content which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 1 is a longitudinal sectional view of a burner for decomposing ammonia fumes, constructed in accordance with the invention;

FIG. 2 is a sectional view taken along the line II—II of FIG. 1;

FIG. 3 is a sectional view showing the beveling of the outlet ends of the air distributing tubes; and FIG. 4 is a bottom plan view of the air distributing tubes indicating the direction of the bevels for the air distributing tubes.

DESCRIPTION OF THE PREFERRED EMBODIMENT

Referring to the drawing in particular, the invention embodied therein, comprises a burner for decomposing ammonia fumes which have a high sulfide content and which includes a cylindrical housing, generally designated 50.

Combustion air enters an air chamber 2 having a circular cross-section through a side connection 1 to the housing 50, and is distributed into air distributing tubes 3 which are firmly and tightly supported in a parting bottom 2a of air chamber 2 which has a cover 2b. Tubes 3 are arranged in a fuel gas chamber 4 which also has a circular cross-section, and the air flows therethrough and leaves through a beveled outlet 8 by which the tubes terminate. Arrows 9 indicate the orientation of the beveled outlets and show, in FIG. 2, that along the outermost radius, the bevels of the tubes face the interior of the chamber. The beveled outlets of tubes 3, arranged along the radii situated more inwardly are oriented in circular rows alternately clockwise and counterclockwise. Coke oven gas is fed into the space of fuel gas chamber 4 through a connection 5, between air distributing tubes 3, and it leaves the chamber through circular bores 10 provided in a bottom 10a of chamber 4. The bores 10 are also advantageously of particular design. The fuel mixes with the air escaping from outlets 8 and undergoes combustion.

Wall 3a of combustion chamber 4 projects downwardly beyond bottom 10a by approximately 0.2 m and is partly surrounded by a jacket 7b which forms a jacket space 7 along with wall 3a. The deacidizer fumes are fed in through this jacket space and a connection 6. The fumes leave jacket space 7 through an outlet 7a and, first, pass along the periphery of the coke oven gas flame. Then, prior to entering the following decomposition reactor, the deacidizer fumes mix intimately with the already burnt-out fuel gas containing only a small amount of $O_2$, and the mixture is heated to 1100° C. In this state, the mixed gases are directed over a nickel catalyst provided in the decomposition zone, which has not been shown. FIG. 1 also shows a supporting flange 3b.

There is already known a burner arrangement for $NH_3$— containing fumes which is allegedly designed so that the $NH_3$ fumes are introduced into the interior of a coke oven gas flame having the shape of a hollow cone (German Auslegeschrift No. 2,241,891). In contradistinction thereto, according to the inventive method, the $NH_3$-containing fumes are fed to the periphery of a full volume of a flame.

The invention is explained by the following example:

Deacidizer fumes in the amount of 1250 m³N per hour and having a content of 20% by volume of $NH_3$, 12% by volume of $H_2S$, and 2% by volume of HCN, were mixed with 375 m³N of coke oven gas (heating power 4300 Kcal/m³N) and the mixture was burned with 1000 m³N of air (deficiency with respect to the sum of the combustible components), with the temperature of the gas mixture rising to 1100° C. The gas mixture was directed over a nickel catalyst (metallic nickel on magnesite balls) and then cooled in a direct cooler. The cracked gas still contained 0.1 g of $NH_3$ per m³N. In the circulating cooling water of the direct cooler, 85 mg of elementary sulfur per liter have been found and the pH value of the cooling water dropped to 6. In addition, the cracked gas contained 6 g of organic sulfur compounds (COS, $CS_2$) per m³N.

After several months of operation, the plant had to be stopped because of the excessive pressure loss in the plant. While cleaning the equipment, pulpy deposits have been found in the gas conduit after the direct cooler, which have caused the pressure loss. In addition, ample corrosion has been noticed. The dry substance obtained from the deposits contained 92% of elementary sulfur.

With this experience, the inventive method has been applied, namely, the combustion air has been adjusted to a water vapor content of 50% by volume, the velocity of the air-steam mixture at the burner outlet has been adjusted to a rate of 8 m per second, and only then the deacidizer fumes containing $NH_3$, HCN and $H_2S$ have been allowed to mix with the combustion gases having a low oxygen content. The temperature of the mixture amounted to 1100° C. The further operation was as described above. Again, the cracked gas still contained 0.1 g of $NH_3$ per $m^3N$, but in the circulating cooling water, no elementary sulfur was detectable and the pH value of the water did not drop below 7. The content in cracked gas and organic sulfur compounds was 2 mg per $m^3N$.

While a specific embodiment of the invention has been shown and described in detail to illustrate the application of the principles of the invention, it will be understood that the invention may be embodied otherwise without departing from such principles.

What is claimed is:

1. A method of decomposing ammonia fumes having a high hydrogen sulfide content, in particular, ammonia fumes in the deacidizer fumes from an $NH_3$—$H_2S$ closed-circuit scrubber of crude coke oven gases, in which the washed-out $NH_3$ is enriched, comprising burning a heating fuel with an amount of oxygen to generate a stream of combustion gases having a low oxygen content, directing the ammonia fumes in substantially the same direction as the stream of combustion gases and into close peripheral contact with the stream of combustion gases to heat the ammonia fumes and form a hot mixture of the gases and deacidizer fumes, and directing the hot mixture through a decomposition zone to decompose the ammonia fumes, whereby a formation of organic sulfur compounds from the deacidizer fumes is reduced, including using combustion air for burning the heating fuel with the oxygen which has a water vapor content of 50% by volume, directing the combustion air with the water vapor content into association with the fuel to form an air-steam mixture, regulating the velocity of the air-steam mixture at the burner outlet to a rate of 8 meters per second and then permitting the ammonia fumes containing $NH_3$, HCN and $H_2S$ to mix with the combustion gases which are formed by the burning which have a low oxygen content.

* * * * *